(12) United States Patent
Fredslund et al.

(10) Patent No.: US 10,544,971 B2
(45) Date of Patent: Jan. 28, 2020

(54) METHOD FOR CONTROLLING A VAPOUR COMPRESSION SYSTEM WITH AN EJECTOR

(71) Applicant: DANFOSS A/S, Nordborg (DK)

(72) Inventors: Kristian Fredslund, Haderslev (DK); Frede Schmidt, Sønderborg (DK); Kenneth Bank Madsen, Ry (DK); Jan Prins, Nordborg (DK)

(73) Assignee: DANFOSS A/S, Nordborg (DK)

( * ) Notice: Subject to any disclaimer, the term of this patent is extended or adjusted under 35 U.S.C. 154(b) by 82 days.

(21) Appl. No.: 15/527,545

(22) PCT Filed: Oct. 7, 2015

(86) PCT No.: PCT/EP2015/073171
§ 371 (c)(1),
(2) Date: May 17, 2017

(87) PCT Pub. No.: WO2016/078825
PCT Pub. Date: May 26, 2016

(65) Prior Publication Data
US 2017/0321941 A1    Nov. 9, 2017

(30) Foreign Application Priority Data

Nov. 19, 2014  (EP) .................................. 14193784
May 28, 2015   (EP) .................................. 15169551

(51) Int. Cl.
*F25B 49/02*   (2006.01)
*F25B 41/00*   (2006.01)
*F25B 9/00*    (2006.01)

(52) U.S. Cl.
CPC .............. *F25B 49/02* (2013.01); *F25B 41/00* (2013.01); *F25B 41/003* (2013.01); *F25B 9/008* (2013.01);

(Continued)

(58) Field of Classification Search
CPC ...... F25B 49/02; F25B 41/00; F25B 2600/02; F25B 2600/0253; F25B 2400/23;

(Continued)

(56) References Cited

U.S. PATENT DOCUMENTS

2009/0241569 A1    10/2009  Okada et al.
2011/0219803 A1*    9/2011  Park .......................... F24F 1/26
                                                          62/238.6

(Continued)

FOREIGN PATENT DOCUMENTS

CN    1309279 A    8/2001
CN    103282730 A  9/2013

(Continued)

OTHER PUBLICATIONS

US 5,385,033 A, 01/1995, Sandofsky et al. (withdrawn)

(Continued)

*Primary Examiner* — Nelson J Nieves
(74) *Attorney, Agent, or Firm* — McCormick, Paulding & Huber LLP

(57) ABSTRACT

A method for controlling a vapor compression system (1) is disclosed, the vapor compression system (1) comprising an ejector (5). The method comprises controlling a compressor unit (2) in order to adjust a pressure inside a receiver (6), on the basis of a detected pressure of refrigerant leaving an evaporator (8). The portion of refrigerant leaving the evaporator (8) which is supplied to a secondary inlet (15) of the ejector is maximized and the portion of refrigerant supplied directly to the compressor unit (2) is minimized, while ensuring that the pressure of refrigerant leaving the evaporator (8) does not decrease below an acceptable level.

18 Claims, 3 Drawing Sheets

(52) U.S. Cl.
CPC ............ *F25B 2341/0012* (2013.01); *F25B 2341/0015* (2013.01); *F25B 2341/0662* (2013.01); *F25B 2400/075* (2013.01); *F25B 2400/13* (2013.01); *F25B 2400/23* (2013.01); *F25B 2500/29* (2013.01); *F25B 2500/31* (2013.01); *F25B 2600/02* (2013.01); *F25B 2600/0253* (2013.01); *F25B 2600/2507* (2013.01); *F25B 2700/197* (2013.01); *Y02B 30/741* (2013.01)

(58) Field of Classification Search
CPC ...... F25B 2341/0662; F25B 2600/2507; F25B 2341/0012; F25B 2400/13; F25B 2341/0015; F25B 41/003; F25B 2400/075; F25B 2700/197; Y02B 30/741
See application file for complete search history.

(56) References Cited

U.S. PATENT DOCUMENTS

| | | | |
|---|---|---|---|
| 2011/0239667 A1* | 10/2011 | Won | F25B 31/004 62/84 |
| 2011/0256005 A1* | 10/2011 | Takeoka | H02P 6/18 417/415 |
| 2011/0283723 A1* | 11/2011 | Yakumaru | F25B 9/06 62/126 |
| 2011/0314854 A1* | 12/2011 | Sata | F25B 41/003 62/190 |
| 2012/0006041 A1* | 1/2012 | Ikeda | F25B 31/004 62/193 |
| 2012/0167601 A1 | 7/2012 | Cogswell et al. | |
| 2013/0174590 A1 | 7/2013 | Sjoholm et al. | |
| 2017/0159977 A1* | 6/2017 | Hellmann | F25B 1/10 |
| 2018/0142927 A1* | 5/2018 | Hellmann | F25B 1/10 |
| 2018/0274821 A1* | 9/2018 | Lee | F25B 1/06 |

FOREIGN PATENT DOCUMENTS

| | | |
|---|---|---|
| JP | H04-316962 A | 11/1992 |
| JP | H04-320762 A | 11/1992 |

OTHER PUBLICATIONS

International Search Report for PCT Serial No. PCT/EP2015/073171 dated Jan. 11, 2016.

Chinese Office Action and English Translation for Serial No. 201580060854.1 dated Jan. 4, 2019.

* cited by examiner

METHOD FOR CONTROLLING A VAPOUR COMPRESSION SYSTEM WITH AN EJECTOR

CROSS-REFERENCE TO RELATED APPLICATIONS

This application is a National Stage application of International Patent Application No. PCT/EP2015/073171, filed on Oct. 7, 2015, which claims priority to European Patent Application No. 14193784.7, filed on Nov. 19, 2014, and to European Patent Application No. 15169551.7, filed on May 28, 2015, each of which is hereby incorporated by reference in its entirety.

TECHNICAL FIELD

The present invention relates to a method for controlling a vapour compression system, the vapour compression system comprising an ejector, in an energy efficient manner, within a wide range of ambient temperatures. The method of the invention is particularly suitable for vapour compression systems in which a transcritical refrigerant, such as $CO_2$, is applied.

BACKGROUND

In some vapour compression systems an ejector is arranged in a refrigerant path, at a position downstream relative to a heat rejecting heat exchanger. Thereby refrigerant leaving the heat rejecting heat exchanger is supplied to a primary inlet of the ejector. Refrigerant leaving an evaporator of the vapour compression system is supplied to a secondary inlet of the ejector.

An ejector is a type of pump which uses the Venturi effect to increase the pressure energy of fluid at a suction inlet (or secondary inlet) of the ejector by means of a motive fluid supplied to a motive inlet (or primary inlet) of the ejector. Thereby, arranging an ejector in the refrigerant path as described will cause the refrigerant to perform work, and thereby the power consumption of the vapour compression system is reduced as compared to the situation where no ejector is provided.

An outlet of the ejector is normally connected to a receiver, in which liquid refrigerant is separated from gaseous refrigerant. The liquid part of the refrigerant is supplied to the evaporator, via an expansion device. The gaseous part of the refrigerant may be supplied to a compressor. Thereby the gaseous part of the refrigerant is not subjected to the pressure drop introduced by the expansion device, and the work required in order to compress the refrigerant can therefore be reduced.

If the pressure inside the receiver is high, the work required by the compressors in order to compress the gaseous refrigerant received from the receiver is correspondingly low. On the other hand, a high pressure inside the receiver has an impact on the liquid/gas ratio of the refrigerant in the receiver to the effect that less gaseous and more liquid refrigerant is present, and a too high pressure inside the receiver is therefore not desirable, as it forces the pressure inside the heat rejecting heat exchanger to be even higher, thereby decreasing the efficiency of the vapour compression system. Furthermore, at low ambient temperatures, the efficiency of the vapour compression system is normally improved when the pressure inside the heat rejecting heat exchanger is relatively low.

Accordingly, a suitable pressure level inside the receiver must be defined, which balances the work required by the compressor and other system requirements, as described above. Furthermore, it is desirable to supply as much refrigerant as possible from the outlet of the evaporator to the secondary inlet of the ejector, because the pressure of the refrigerant being supplied to the compressors is higher, thereby reducing the amount of work required by the compressors in order to compress the refrigerant. However, the amount of refrigerant being supplied from the outlet of the evaporator to the secondary inlet of the ejector must not be so large that the pressure of the refrigerant leaving the evaporator decreases below an acceptable level. The amount of refrigerant being sucked into the secondary inlet of the ejector depends, inter alia, upon the pressure difference between the pressure of the refrigerant leaving the heat rejecting heat exchanger and the pressure of the refrigerant leaving the ejector, i.e. the pressure inside the receiver.

US 2012/0167601 A1 discloses an ejector cycle. A heat rejecting heat exchanger is coupled to a compressor to receive compressed refrigerant. An ejector has a primary inlet coupled to the heat rejecting heat exchanger, a secondary inlet and an outlet. A separator has an inlet coupled to the outlet of the ejector, a gas outlet and a liquid outlet. The system can be switched between first and second modes. In the first mode refrigerant leaving the heat absorbing heat exchanger is supplied to the secondary inlet of the ejector. In the second mode refrigerant leaving the heat absorbing heat exchanger is supplied to the compressor.

SUMMARY

It is an object of embodiments of the invention to provide a method for controlling a vapour compression system in an energy efficient manner within a wide range of ambient temperatures.

According to a first aspect the invention provides a method for controlling a vapour compression system, the vapour compression system comprising a compressor unit comprising one or more compressors, a heat rejecting heat exchanger, an ejector, a receiver, an expansion device and an evaporator arranged in a refrigerant path, wherein an outlet of the heat rejecting heat exchanger is connected to a primary inlet of the ejector, an outlet of the ejector is connected to the receiver and an outlet of the evaporator is selectively connected to a secondary inlet of the ejector and/or to an inlet of the compressor unit, and wherein a gaseous outlet of the receiver is connected to an inlet of the compressor unit, the method comprising the steps of:

detecting a pressure of refrigerant leaving the evaporator, detecting a state of the compressor unit, said state of the compressor unit indicating whether or not refrigerant is supplied from the outlet of the evaporator to the inlet of the compressor unit, in the case that the step of detecting a state of the compressor unit reveals that refrigerant is supplied from the outlet of the evaporator to the inlet of the compressor unit, operating the compressor unit in order to decrease a pressure inside the receiver, in the case that the step of detecting a state of the compressor unit reveals that refrigerant is not supplied from the outlet of the evaporator to the inlet of the compressor unit, comparing the detected pressure of refrigerant leaving the evaporator to a lower threshold value and to an upper threshold value, and operating the compressor unit in order to:
increase a pressure inside the receiver in the case that the detected pressure of refrigerant leaving the evaporator is below the lower threshold value,
decrease a pressure inside the receiver in the case that the detected pressure of refrigerant leaving the evaporator is above the upper threshold value, and
maintain a pressure inside the receiver in the case that the detected pressure of refrigerant leaving the evaporator is between the lower threshold value and the upper threshold value.

According to the first aspect, the invention provides a method for controlling a vapour compression system. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor unit comprising one or more compressors, a heat rejecting heat exchanger, an ejector, a receiver, an expansion device, e.g. in the form of an expansion valve, and an evaporator arranged in a refrigerant path.

An outlet of the heat rejecting heat exchanger is connected to a primary inlet of the ejector. Accordingly, refrigerant leaving the heat rejecting heat exchanger is supplied to the primary inlet of the ejector.

An outlet of the ejector is connected to the receiver. Accordingly, refrigerant leaving the ejector is supplied to the receiver.

An outlet of the evaporator is selectively connected to a secondary inlet of the ejector and/or to an inlet of the compressor unit. Accordingly, refrigerant leaving the evaporator is either supplied to the secondary inlet of the ejector or to the compressor unit. All of the refrigerant leaving the evaporator may be supplied to the secondary inlet of the ejector. As an alternative, all of the refrigerant leaving the evaporator may be supplied to the compressor unit. As another alternative, some of the refrigerant leaving the evaporator may be supplied to the secondary inlet of the ejector, and some of the refrigerant leaving the evaporator may be supplied to the compressor unit. Furthermore, it can be selected which of the three options described above is to be applied, in any given situation, and under the given circumstances.

A gaseous outlet of the receiver is connected to an inlet of the compressor unit. Accordingly, the gaseous part of the refrigerant in the receiver is supplied to the compressor.

Refrigerant flowing in the refrigerant path is compressed by the compressor(s) of the compressor unit. The compressed refrigerant is supplied to the heat rejecting heat exchanger, where heat exchange takes place with the ambient in such a manner that heat is rejected from the refrigerant flowing through the heat rejecting heat exchanger. In the case that the heat rejecting heat exchanger is in the form of a condenser, the refrigerant is at least partly condensed when passing through the heat rejecting heat exchanger. In the case that the heat rejecting heat exchanger is in the form of a gas cooler, the refrigerant flowing through the heat rejecting heat exchanger is cooled, but it remains in a gaseous state.

From the heat rejecting heat exchanger, the refrigerant is supplied to the primary inlet of the ejector, and from the outlet of the ejector the refrigerant is supplied to the receiver. In the receiver, the refrigerant is separated into a liquid part and a gaseous part. The liquid part of the refrigerant is supplied to the expansion device, where the refrigerant is expanded before being supplied to the evaporator. The refrigerant being supplied to the evaporator is thereby in a mixed gaseous and liquid state. In the evaporator, the liquid part of the refrigerant is at least partly evaporated, while heat exchange takes place with the ambient in such a manner that heat is absorbed by the refrigerant flowing through the evaporator.

From the outlet of the evaporator the refrigerant is supplied to the secondary inlet of the ejector and/or to the compressor unit, as described above.

The gaseous part of the refrigerant in the receiver is supplied to the compressor unit. Thereby the gaseous refrigerant is not subjected to the pressure drop introduced by the expansion device, and energy consumed by the compressors is reduced, as described above.

Thus, at least part of the refrigerant flowing in the refrigerant path is alternatingly compressed by the compressors and expanded by the expansion device, while heat exchange takes place at the heat rejecting heat exchanger and at the evaporator. Thereby cooling or heating of a volume can be obtained.

According to the method of the invention, a pressure of refrigerant is initially detected. Furthermore, a state of the compressor unit is detected. The state of the compressor unit being detected is of a kind which indicates whether or not refrigerant is supplied from the outlet of the evaporator to the inlet of the compressor unit. Thus, referring to the three options described above, it is detected whether, on the one hand, refrigerant leaving the evaporator is only supplied to the secondary inlet of the ejector or, on the other hand, refrigerant leaving the evaporator is supplied to the secondary inlet of the ejector as well as to the inlet of the compressor unit or only to the compressor unit. The step of detecting a state of the compressor unit could, e.g., include detecting whether or not one or more compressors dedicated to compressing refrigerant received from the evaporator is/are operating. As an alternative, the step of detecting a state of the compressor unit could, e.g., include detecting a state of a valve controlling a supply of refrigerant from the evaporator to the compressor unit. This will be described in further detail below.

In the case that the detected state of the compressor unit reveals that refrigerant is supplied to the compressor unit, this is an indication that at least some of the refrigerant leaving the evaporator is supplied to the compressors instead of to the secondary inlet of the ejector. Therefore it is possible to control the vapour compression system in a manner which ensures that more refrigerant is supplied from the outlet of the evaporator to the secondary inlet of the ejector, thereby allowing a larger portion of the refrigerant to perform work instead of being compressed directly by the compressors of the compressor unit.

In order to obtain this, the compressor unit is operated in order to decrease a pressure inside the receiver. The amount of refrigerant flowing from the outlet of the evaporator to the secondary inlet of the ejector is in principle determined by the following equation:

$$K = \dot{m} \cdot \Delta p,$$

where K is a constant, $\dot{m}$ is the mass flow of refrigerant being supplied from the outlet of the evaporator to the secondary inlet of the ejector, and $\Delta p$ is the difference between the pressure inside the receiver and the pressure of the refrigerant leaving the evaporator. It should be noted that a factor may be added to the equation above, in order to account for the efficiency of the ejector. Thus, if the pressure inside the receiver is decreased, then the pressure inside the receiver approaches the pressure of the refrigerant leaving the evaporator, and the pressure difference, Δp, is therefore decreased. As a consequence, the mass flow, ṁ, is increased, i.e. a larger part of the refrigerant leaving the evaporator is supplied to the secondary inlet of the ejector, as desired.

On the other hand, in the case that the step of detecting a state of the compressor unit reveals that refrigerant is not supplied from the outlet of the evaporator to the compressor unit, this is an indication that all of the refrigerant leaving the evaporator is supplied to the secondary inlet of the ejector. Accordingly, the refrigerant performs work to the greatest possible extend. However, in this case it must be ensured that the pressure of the refrigerant leaving the evaporator does not decrease below an acceptable level. Therefore, the detected pressure of refrigerant leaving the evaporator is compared to a lower threshold value and to an upper threshold value.

If the comparison reveals that the detected pressure of refrigerant leaving the evaporator is below the lower threshold value, this is an indication that there is a risk that the pressure of refrigerant leaving the evaporator decreases below an acceptable level. It is therefore desirable to increase the pressure of the refrigerant leaving the evaporator. This can be obtained by decreasing the mass flow of refrigerant being supplied from the outlet of the evaporator to the secondary inlet of the ejector.

In order to obtain this, the compressor unit is operated in order to increase the pressure inside the receiver. Referring to the equation above, when the pressure inside the receiver is increased, the pressure difference, Δp, is increased. As a consequence, the mass flow, ṁ, is decreased, and the pressure of the refrigerant leaving the evaporator is thereby increased, as desired.

If the comparison reveals that the detected pressure of refrigerant leaving the evaporator is above the upper threshold value, this is an indication that the amount of refrigerant being supplied from the outlet of the evaporator to the secondary inlet of the ejector may be insufficient to remove the refrigerant leaving the evaporator. There is therefore a risk that the pressure of refrigerant leaving the evaporator increases to a level which causes a connection between the outlet of the evaporator and the compressor unit to be opened, e.g. by starting a compressor being connected to the outlet of the evaporator. This is undesirable, and therefore the pressure of the refrigerant leaving the evaporator needs to be decreased. This can be obtained by increasing the mass flow of refrigerant being supplied from the outlet of the evaporator to the secondary inlet of the ejector.

In order to obtain this the compressor unit is operated in order to decrease the pressure inside the receiver. Referring to the equation above, when the pressure inside the receiver is decreased, the pressure inside the receiver approaches the pressure of the refrigerant leaving the evaporator, and the pressure difference, Δp, is therefore decreased. As a consequence, the mass flow, ṁ, is increased, and the pressure of the refrigerant leaving the evaporator is thereby decreased, as desired.

Finally, if the comparison reveals that the detected pressure of refrigerant leaving the evaporator is between the lower threshold value and the upper threshold value, this is an indication that the pressure of refrigerant leaving the evaporator is within an acceptable range. Therefore the compressor unit is, in this case, operated in order to maintain the pressure inside the receiver.

Thus, the method of the invention allows refrigerant to be supplied from the outlet of the evaporator to the secondary inlet of the ejector to the greatest possible extent, without risking that the pressure of refrigerant leaving the evaporator decreases below an acceptable level.

The compressor unit may comprise one or more main compressors and one or more receiver compressors, the main compressor(s) being connected to the outlet of the evaporator, and the receiver compressor(s) being connected to the gaseous outlet of the receiver, and the step of detecting a state of the compressor unit may comprise detecting whether or not one or more of the main compressor(s) is/are operating.

According to this embodiment, some of the compressors, i.e. the main compressors, of the compressor unit are dedicated for compressing refrigerant received from the outlet of the evaporator, and some of the compressors, i.e. the receiver compressors, of the compressor unit are dedicated for compressing refrigerant received from the gaseous outlet of the receiver. The main compressors and the receiver compressors are operated independently of each other, and may be arranged in separate compressor racks.

In this case, the step of detecting a state of the compressor unit comprises detecting whether or not one or more of the main compressor(s) is/are operating. If none of the main compressors are operating, then no refrigerant is supplied from the outlet of the evaporator to the compressor unit. On the other hand, if at least one of the main compressor(s) is operating, then at least some of the refrigerant leaving the evaporator is supplied directly to the compressor unit, and is compressed by the operating main compressor(s).

In the embodiment described above, the steps of operating the compressor unit to increase or decrease the pressure inside the receiver may comprise operating the receiver compressor(s) to adjust the pressure inside the receiver. Since the receiver compressor(s) is/are connected directly to the gaseous outlet of the receiver, the mass flow of refrigerant from the gaseous outlet of the receiver to the compressor unit can be adjusted by adjusting operation of the receiver compressor(s). Adjusting this mass flow will result in an adjustment of the pressure inside the receiver. For instance, the capacity of the receiver compressor(s) may be adjusted, e.g. by adjusting the speed of one or more receiver compressors and/or by switching one or more receiver compressors on or off.

The method may further comprise the steps of detecting whether or not one or more of the receiver compressor(s) is/are operating, and operating the compressor unit in order to decrease a pressure inside the receiver in the case that the receiver compressor(s) is/are not operating.

If none of the receiver compressor(s) is/are operating, this is an indication that gaseous refrigerant is not supplied from the gaseous outlet of the receiver to the compressor unit. This may be because the amount of available gaseous refrigerant in the receiver is insufficient to ensure proper operation of at least one receiver compressor. Since energy is conserved when gaseous refrigerant is supplied directly from the gaseous outlet of the receiver to the compressor unit, it is desirable to increase the amount of available gaseous refrigerant in the receiver. This can be obtained by decreasing the pressure inside the receiver.

According to an alternative embodiment, the compressor unit may comprise one or more valves arranged to control whether the inlet of the compressor unit is connected to the gaseous outlet of the receiver or to the outlet of the evaporator, and the step of detecting a state of the compressor unit may comprise detecting a state of the one or more valves.

According to this embodiment, the compressors of the compressor unit are not dedicated for compressing refrigerant received from the outlet of the evaporator or for compressing refrigerant received from the gaseous outlet of the receiver. Instead, the compressors of the compressor unit may either operate as a 'main compressor' or as a 'receiver compressor', in the manner described above, and whether a given compressor is to operate as a 'main compressor' or as a 'receiver compressor' at any given time can be selected by switching one or more of the valves in an appropriate manner.

Thus, in this case the available compressor capacity of the compressor unit can be shifted between 'main compressor capacity' and 'receiver compressor capacity', according to the current requirements, and an appropriate distribution of the available compressor capacity can be obtained by controlling the one or more valves in an appropriate manner.

In this case, the step of detecting a state of the compressor unit comprises detecting a state of the one or more valves. In particular, it is investigated whether or not at least one valve is in a position where refrigerant is supplied from the outlet of the evaporator to the compressor unit. It should be noted that the step of detecting a state of the compressor unit may further comprise determining whether or not one or more of the compressors of the compressor unit is/are operating, in addition to detecting a state of the one or more valves.

The one or more valves may, e.g., be in the form of three way valves.

According to this embodiment, the step of operating the compressor unit to decrease the pressure inside the receiver, in the case that refrigerant is supplied from the outlet of the evaporator to the inlet of the compressor unit, may comprise switching at least one of the one or more valves to a position where the inlet of the compressor unit is connected to the gaseous outlet of the receiver.

When refrigerant is being supplied from the outlet of the evaporator to the compressor unit, at least one valve may be in a position which allows this. Therefore, in order to decrease the pressure inside the receiver, at least one valve is switched from the position where the inlet of the compressor unit is connected to the outlet of the evaporator to the position where the inlet of the compressor unit is connected to the gaseous outlet of the receiver. Thereby the distribution of the available compressor capacity is changed in such a manner that a larger portion of the available compressor capacity is assigned to 'receiver compressor capacity', and a smaller portion is assigned to 'main compressor capacity'. As a consequence, the mass flow of gaseous refrigerant from the gaseous outlet of the receiver to the compressor unit is increased, and the pressure inside the receiver is thereby decreased. Furthermore, in the case that all valves are switched to the position where the inlet of the compressor unit is connected to the gaseous outlet of the receiver, there is no longer an open flow path from the outlet of the evaporator to the compressor unit. Thereby it is ensured that all of the refrigerant leaving the evaporator is supplied to the secondary inlet of the ejector.

The steps of operating the compressor unit to decrease or increase the pressure inside the receiver, in the case that refrigerant is not supplied from the outlet of the evaporator to the inlet of the compressor unit, may comprise increasing or decreasing a compressor capacity of the compressor unit. This may, e.g., include increasing or decreasing the speed of one or more compressors, and/or switching one or more compressors on or off.

The steps of operating the compressor unit may comprise the steps of:
  adjusting a setpoint value for the pressure inside the receiver, in accordance with the detected pressure of refrigerant leaving the evaporator, and
  operating the compressor unit in accordance with the adjusted setpoint value.

According to this embodiment, the compressor unit is operated on the basis of a setpoint value for the pressure inside the receiver. However, the setpoint value is not a fixed value, but is varied in accordance with the detected pressure of refrigerant leaving the evaporator. The setpoint is adjusted, i.e. increased or decreased, essentially as described above.

The vapour compression system may further comprise a high pressure valve interconnecting an outlet of the heat rejecting heat exchanger and an inlet of the receiver, the high pressure valve being arranged in parallel to the ejector, and refrigerant leaving the heat rejecting heat exchanger may be divided into a flow passing through the high pressure valve and a flow passing through the ejector, via the primary inlet of the ejector. According to this embodiment, it is possible to adjust how large a portion of the refrigerant leaving the heat rejecting heat exchange it is desired to pass through the ejector.

The vapour compression system may be arranged to have a transcritical refrigerant, such as $CO_2$, flowing in the refrigerant path. In vapour compression systems of this kind, the pressure prevailing in the high pressure part of the system is normally relatively high. It is therefore very relevant to reduce the work required by the compressors in order to compress the refrigerant in vapour compression systems of this kind.

The heat rejecting heat exchanger may be a gas cooler. In this case the refrigerant flowing through the heat rejecting heat exchanger remains in a gaseous phase, and the gaseous refrigerant is merely cooled due to the heat exchange taking place in the heat rejecting heat exchanger. Gas coolers are typically applied when a transcritical refrigerant, such as $CO_2$, is used in the vapour compression system.

As an alternative, the heat rejecting heat exchanger may be a condenser. In this case the refrigerant passing through the heat rejecting heat exchanger is at least partly condensed, during the heat exchange taking place.

The vapour compression system may further comprise a bypass valve arranged in a refrigerant path interconnecting the gaseous outlet of the receiver and the inlet of the compressor unit, and the method may further comprise the step of opening the bypass valve in the case that the pressure inside the receiver decreases below a minimum value. The bypass valve may further be opened in the case that the pressure inside the receiver becomes very high, indicating that the "receiver compressors" are not capable of compressing the amount of gaseous refrigerant being present in the receiver.

When the pressure inside the receiver decreases below a minimum value, the amount of gaseous refrigerant being available in the receiver is so small that it is insufficient to properly operate a dedicated compressor. Therefore, in this case the bypass valve is opened, and the gaseous part of the refrigerant in the receiver is instead mixed with the refrigerant leaving the evaporator, before it reaches the compressor unit. Such a decrease in pressure may, e.g., be the result of a temperature of refrigerant leaving the heat rejecting heat exchanger decreasing below a certain value.

According to a second aspect the invention provides a vapour compression system comprising a compressor unit comprising one or more compressors, a heat rejecting heat exchanger, an ejector, a receiver, an expansion device and an evaporator arranged in a refrigerant path, wherein an outlet of the heat rejecting heat exchanger is connected to a primary inlet of the ejector and an outlet of the ejector is connected to the receiver, wherein the vapour compression system further comprises one or more valves arranged to control whether an inlet of the compressor unit is connected to a gaseous outlet of the receiver and/or to an outlet of the evaporator, and wherein the outlet of the evaporator is connected to the one or more valves and to a secondary inlet of the ejector.

It should be noted that a person skilled in the art would readily recognise that any feature described in combination with the first aspect of the invention could also be combined with the second aspect of the invention, and vice versa. Thus, the method according to the first aspect of the invention could therefore appropriately be performed in a vapour compression system according to the second aspect of the invention, and the remarks set forth above with reference to the first aspect of the invention are therefore equally applicable here.

The vapour compression system according to the second aspect of the invention is of a kind which comprises one or more valves arranged to control whether an inlet of the compressor unit is connected to a gaseous outlet of the receiver and/or to an outlet of the evaporator. Thus, the compressors of the compressor unit are not dedicated for compressing refrigerant received from the outlet of the evaporator or for compressing refrigerant received from the gaseous outlet of the receiver, but may instead either operate as a 'main compressor' and/or as a 'receiver compressor', as described above with reference to the first aspect of the invention, depending on the position of the valve(s). The position of the valve(s) may be such that the inlet of the compressor unit only receives refrigerant from the outlet of the evaporator, or such that the inlet of the compressor unit only receives refrigerant from the gaseous outlet of the receiver, or such that the inlet of the compressor unit receives refrigerant from the outlet of the evaporator as well as from the gaseous outlet of the receiver.

Furthermore, the outlet of the evaporator is connected to the one or more valves and to a secondary inlet of the ejector. Thus, refrigerant leaving the evaporator is either supplied to the secondary inlet of the ejector, or to the inlet of the compressor unit, via the one or more valves. In the case that the one or more valves is/are in a position which prevents that refrigerant is supplied from the outlet of the evaporator to the inlet of the compressor unit, then all of the refrigerant leaving the evaporator is supplied to the secondary inlet of the ejector. In the case that the one or more valves is/are in a position which allows refrigerant to be supplied from the outlet of the evaporator to the inlet of the compressor unit, then all of the refrigerant leaving the evaporator may be supplied to the compressor unit, or all of the refrigerant leaving the evaporator may be supplied to the secondary inlet of the ejector, or some of the refrigerant leaving the evaporator may be supplied to the inlet of the compressor unit and some of the refrigerant may be supplied to the secondary inlet of the ejector.

Thus, the pressure inside the receiver can be adjusted by appropriately adjusting the position of the valve(s) to increase or decrease the refrigerant flow from the gaseous outlet of the receiver towards the inlet of the compressor unit.

The one or more valves may be or comprise a three way valve being switchable between a position where refrigerant is supplied from the outlet of the evaporator to the inlet of the compressor unit, and a position where refrigerant is supplied from the gaseous outlet of the receiver to the inlet of the compressor unit. A three way valve is easy to operate, and therefore the pressure inside the receiver can easily be controlled in a vapour compression system according to this embodiment.

BRIEF DESCRIPTION OF THE DRAWINGS

The invention will now be described in further detail with reference to the accompanying drawings in which.

DETAILED DESCRIPTION

Figure 1:
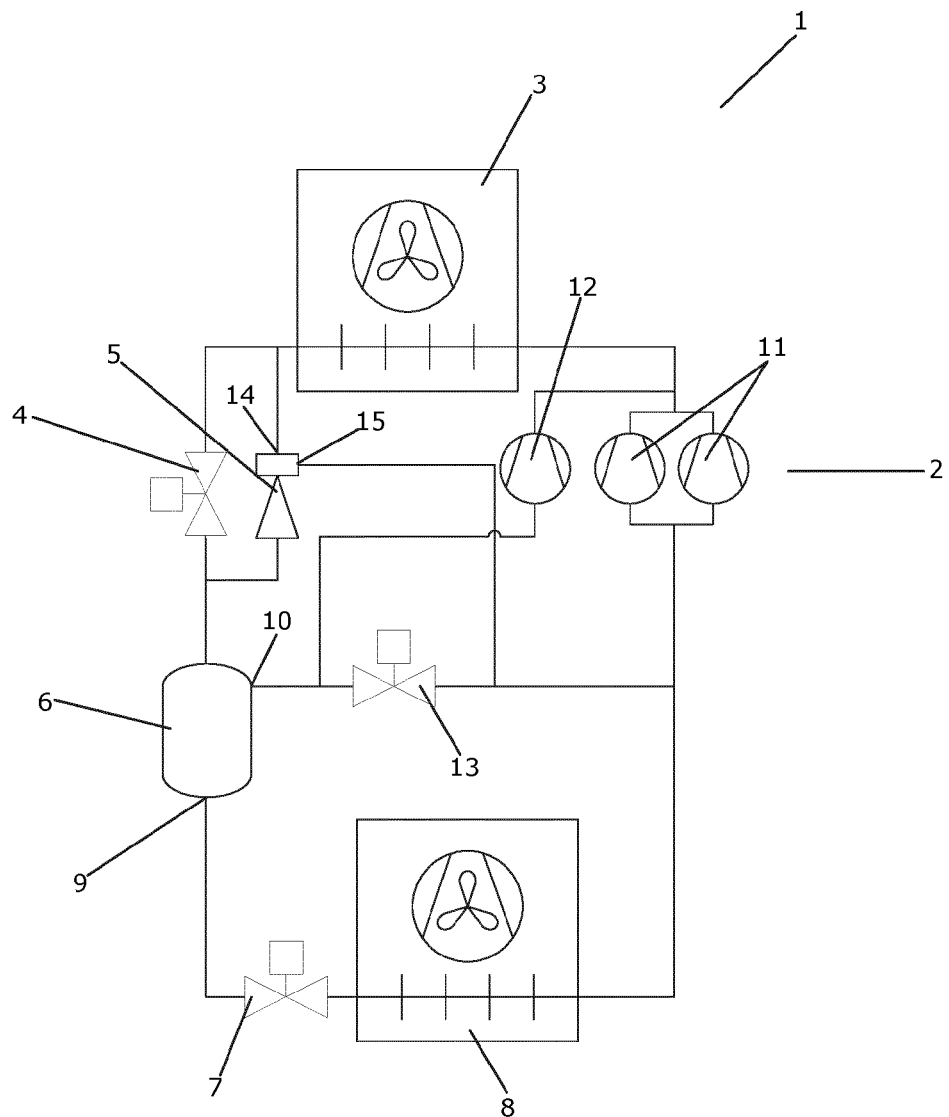
FIG. 1 is a diagrammatic view of a vapour compression system being controlled using a method according to a first embodiment of the invention.

FIG. 1 is a diagrammatic view of a vapour compression system 1 being controlled using a method according to a first embodiment of the invention. The vapour compression system 1 comprises a compressor unit 2, a heat rejecting heat exchanger 3, a high pressure valve 4, an ejector 5, a receiver 6, an expansion device 7, in the form of an expansion valve, and an evaporator 8 arranged in a refrigerant path. The receiver 6 comprises a liquid outlet 9 and a gaseous outlet 10. The liquid outlet 9 is connected to the expansion device 7, i.e. the liquid part of the refrigerant in the receiver 6 is supplied to the evaporator 8, via the expansion device 7.

The compressor unit 2 comprises two main compressors 11 and a receiver compressor 12. The inlets of the main compressors 11 are connected to an outlet of the evaporator 8. Thus, the main compressors 11 are dedicated for compressing refrigerant received from the outlet of the evaporator 8.

The inlet of the receiver compressor 12 is connected to the gaseous outlet 10 of the receiver 6. Thus, the receiver compressor 12 is dedicated for compressing refrigerant received from the gaseous outlet 10 of the receiver 6.

The vapour compression system 1 further comprises a bypass valve 13 arranged in a refrigerant path interconnecting the gaseous outlet 10 of the receiver 6 and the inlets of the main compressors 11. Thus, when the bypass valve 13 is open, gaseous refrigerant from the receiver 6 is supplied to the main compressors 11.

Refrigerant leaving the heat rejecting heat exchanger 3 is divided between the high pressure valve 4 and a primary inlet 14 of the ejector 5, in such a manner that some of the refrigerant may pass through the high pressure valve 4, and at least some of the refrigerant passes through the ejector 5, via the primary inlet 14, before being supplied to the receiver 6.

A secondary inlet 15 of the ejector 5 is connected to the outlet of the evaporator 8. Thus, refrigerant leaving the evaporator 8 can selectively be supplied to the secondary inlet 15 of the ejector 5, or to the main compressors 11.

The vapour compression system 1 of FIG. 1 may be operated in the following manner. Refrigerant is compressed by the compressors 11, 12 of the compressor unit 2 before being supplied to the heat rejecting heat exchanger 3. In the heat rejecting heat exchanger 3 heat exchange takes place between the refrigerant and the ambient, in such a manner that heat is rejected from the refrigerant flowing through the heat rejecting heat exchanger 3.

The refrigerant leaving the heat rejecting heat exchanger 3 is supplied to one or both of the high pressure valve 4 and the primary inlet 14 of the ejector 5, as described above, where the refrigerant undergoes expansion before being supplied to the receiver 6.

In the receiver 6 the refrigerant is separated into a liquid part and a gaseous part. The liquid part of the refrigerant is supplied to the expansion device 7, via the liquid outlet 9. The expansion device 7 expands the refrigerant before it is supplied to the evaporator 8. The refrigerant being supplied to the evaporator 8 is in a mixed liquid and gaseous state.

In the evaporator 8 the liquid part of the refrigerant is at least partly evaporated, while heat exchange takes place between the refrigerant and the ambient in such a manner that heat is absorbed by the refrigerant flowing through the evaporator 8. The refrigerant leaving the evaporator 8 is either supplied to the main compressors 11 or to the secondary inlet 15 of the ejector 5, where the pressure of the refrigerant is increased due to work performed by the refrigerant received at the primary inlet 14 of the ejector 5 from the heat rejecting heat exchanger 3.

The gaseous part of the refrigerant in the receiver 6 is supplied directly to the receiver compressor 12. Thereby the gaseous part of the refrigerant does not undergo the expansion introduced by the expansion device 7, and the work required by the receiver compressor 12 in order to compress the refrigerant is thereby reduced.

It is desirable to direct as much refrigerant as possible from the outlet of the evaporator 8 to the secondary inlet 15 of the ejector 5. In fact, it is preferable that the main compressors 11 are not operating at all, and that all of the refrigerant leaving the evaporator 8 is thereby directed to the primary inlet 15 of the ejector 5. However, it must still be ensured that the pressure of the refrigerant leaving the evaporator 8 does not decrease below an acceptable level, or increase above an acceptable level.

To this end, it is initially detected whether or not at least one of the main compressors 11 is operating. If this is the case, then at least some of the refrigerant leaving the evaporator 8 is supplied to the main compressors 11. If none of the main compressors 11 is operating, then all of the refrigerant leaving the evaporator 8 is supplied to the secondary inlet 15 of the ejector 5.

In the case that it is revealed that at least one of the main compressors 11 is operating, it is desirable to cause a larger portion of the refrigerant leaving the evaporator 8 to be supplied to the secondary inlet 15 of the ejector 5. In order to obtain this, the speed of the receiver compressor 12 is increased. This causes the mass flow of gaseous refrigerant from the gaseous outlet 10 of the receiver 6 to the receiver compressor 12 to increase, thereby decreasing the pressure inside the receiver 6.

As described above, the mass flow of refrigerant from the outlet of the evaporator 8 to the secondary inlet 15 of the ejector 5 is, in principle, determined by the following equation:

$$K = \dot{m} \cdot \Delta p,$$

where K is a constant, $\dot{m}$ is the mass flow of refrigerant being supplied from the outlet of the evaporator 8 to the secondary inlet 15 of the ejector 5, and $\Delta p$ is the difference between the pressure inside the receiver 6 and the pressure of the refrigerant leaving the evaporator 8. Accordingly, the decrease in pressure inside the receiver 6 described above results in a decrease in the pressure difference, $\Delta p$, and thereby in an increase in the mass flow, $\dot{m}$. Eventually this will cause the pressure of refrigerant leaving the evaporator 8 to decrease to a level which causes the main compressors 11 to stop operating.

In the case that it is revealed that none of the main compressors 11 is operating, the pressure of refrigerant leaving the evaporator 8 is detected, and the detected pressure is compared to a lower threshold value and to an upper threshold value.

In the case that the detected pressure of refrigerant leaving the evaporator 8 is below the lower threshold value, there is a risk that the pressure of refrigerant leaving the evaporator 8 decreases to an unacceptable level. It is therefore desirable to increase the pressure of refrigerant leaving the evaporator 8 in this case. This may be obtained by decreasing the mass flow of refrigerant supplied from the outlet of the evaporator 8 to the secondary inlet 15 of the ejector 5.

In order to obtain this, the speed of the receiver compressor 12 is decreased. Thereby the mass flow of gaseous refrigerant from the gaseous outlet 10 of the receiver 6 to the receiver compressor 12 is decreased, and the pressure inside the receiver 6 is increased accordingly. Referring to the equation above, this causes the pressure difference, $\Delta p$, to increase, and thereby the mass flow, $\dot{m}$, to decrease.

In the case that the detected pressure of refrigerant leaving the evaporator 8 is above the upper threshold value, there is a risk that the pressure of the refrigerant leaving the evaporator 8 increases to a level which causes one or more of the main compressors 11 to start operating. It is therefore desirable to decrease the pressure of refrigerant leaving the evaporator 8 in this case. This may be obtained by increasing the mass flow of refrigerant supplied from the outlet of the evaporator 8 to the secondary inlet 15 of the ejector 5.

In order to obtain this, the speed of the receiver compressor 12 is increased. Thereby the mass flow of gaseous refrigerant from the gaseous outlet 10 of the receiver 6 to the receiver compressor 12 is increased, and the pressure inside the receiver 6 is decreased accordingly. Referring to the equation above, this causes the pressure difference, $\Delta p$, to decrease, and thereby the mass flow, $\dot{m}$, to increase.

In the case that the detected pressure of refrigerant leaving the evaporator 8 is between the lower threshold value and the upper threshold value, the pressure of refrigerant leaving the evaporator 8 is within a suitable range, and no adjustments are therefore made to the operation of the receiver compressor 12.

In the case that the pressure inside the receiver 6 decreases below a predefined threshold value, the amount of gaseous refrigerant in the receiver 6 is no longer sufficient to allow the receiver compressor 12 to operate properly. Therefore, in this case the receiver compressor 12 is stopped and the bypass valve 13 is opened. Thereby the gaseous refrigerant from the receiver 6 is supplied to the refrigerant path interconnecting the outlet of the evaporator 8 and the inlet of the main compressors 11. Thus, the gaseous refrigerant from the receiver 6 is mixed with the refrigerant leaving the evaporator 8, and the mixed refrigerant flow is supplied to the main compressors 11 and compressed by means of the main compressors 11 before being supplied to the heat rejecting heat exchanger 3.

Figure 2:
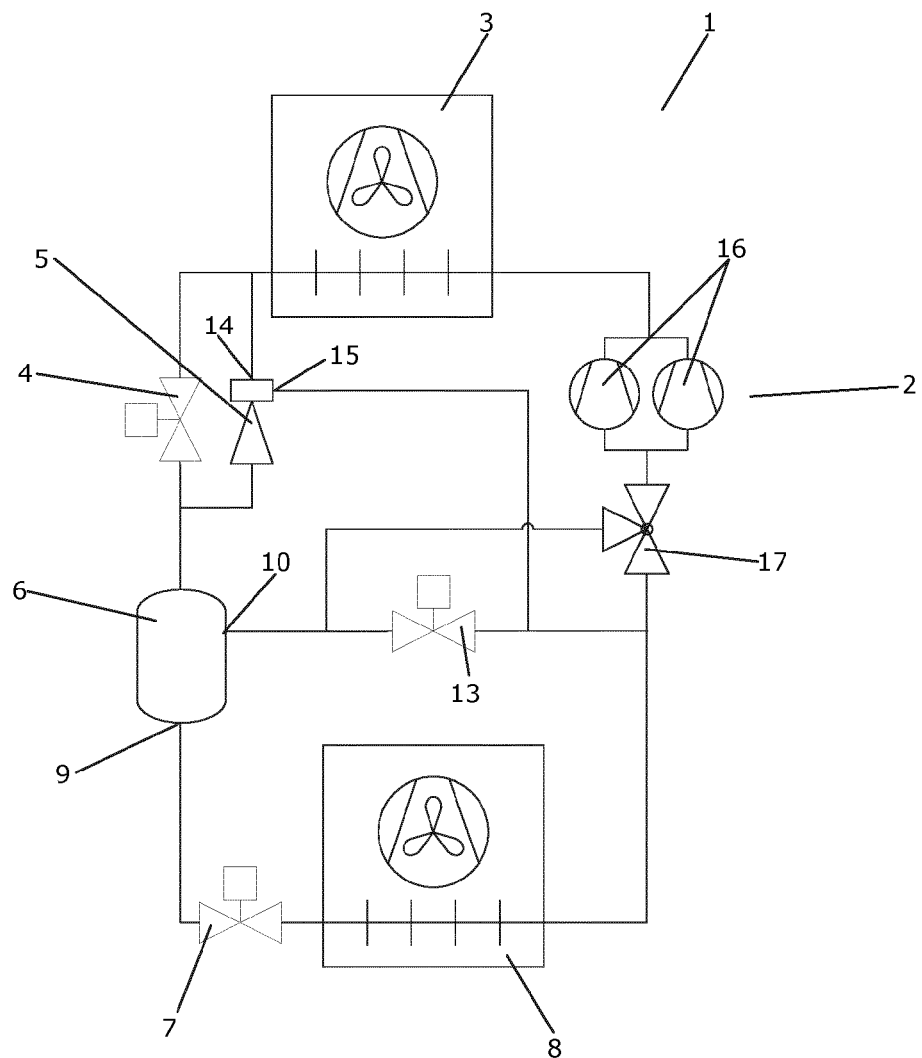
FIG. 2 is a diagrammatic view of a vapour compression system being controlled using a method according to a second embodiment of the invention.

FIG. 2 is a diagrammatic view of a vapour compression system 1 being controlled using a method according to a second embodiment of the invention. The vapour compression system 1 of FIG. 2 is very similar to the vapour compression system 1 of FIG. 1, and it will therefore not be described in detail here.

In the vapour compression system 1 of FIG. 2, the compressor unit 2 comprises two compressors 16 and a three way valve 17 which is switchable between a position where refrigerant is supplied from the outlet of the evaporator 8 to the compressors 16, and a position where refrigerant is supplied from the gaseous outlet 10 of the receiver 6 to the compressors 16. Accordingly, the compressors 16 of the compressor unit 2 may selectively operate as 'main compressors' or as 'receiver compressors'.

The vapour compression system 1 of FIG. 2 is operated essentially as described above with reference to FIG. 1. However, in the vapour compression system 1 of FIG. 2, the position of the three way valve 17 is initially detected, instead of detecting whether or not at least one main compressor is operating. Thus, it is essentially detected whether the compressors 16 operate as 'main compressors' or as 'receiver compressors'.

If the three way valve 17 is in a position where the outlet of the evaporator 8 is connected to the inlet of the compressors 16, i.e. the compressors 16 operate as 'main compressors', then the three way valve 17 is switched to a position where the gaseous outlet 10 of the receiver 6 is connected to the inlet of the compressors 16. Thus, the compressors 16 are caused to operate as 'receiver compressors'. This will cause an increase in mass flow of gaseous refrigerant from the gaseous outlet 10 of the receiver 6 to the inlet of the compressors 16, leading to a decrease in the pressure difference, $\Delta p$, and a corresponding increase in the mass flow, $\dot{m}$, essentially as described above.

If, on the other hand, the three way valve 17 is in a position where the gaseous outlet 10 of the receiver 6 is connected to the inlet of the compressors 16, i.e. the compressors 16 operate as 'receiver compressors', then the pressure of refrigerant leaving the evaporator 8 is detected and compared to a lower threshold value and to an upper threshold value, as described above. The mass flow, $\dot{m}$, is then adjusted essentially as described above with reference to FIG. 1, by adjusting the capacity of the compressors 16, e.g. by adjusting the speed of the one or both of the compressors 16 and/or by switching one of the compressors 16 on or off.

In the case that the pressure inside the receiver 6 decreases below a minimum value, the amount of gaseous refrigerant in the receiver 6 is no longer sufficient to allow one of the compressors 16 of the compressor unit 2 to operate properly, when the three way valve 17 is in the position where the gaseous outlet 10 of the receiver 6 is connected to the compressors 16. Therefore, in this case the three way valve 17 is switched to the position where the outlet of the evaporator 8 is connected to the compressors 16, and the bypass valve 13 is opened. Thereby the gaseous refrigerant from the receiver 6 is supplied to the refrigerant path interconnecting the outlet of the evaporator 8 and the compressors 16. Thus, the gaseous refrigerant from the receiver 6 is mixed with the refrigerant leaving the evaporator 8, and the mixed refrigerant flow is supplied to the compressors 16 where it is compressed before being supplied to the heat rejecting heat exchanger 3.

Figure 3:
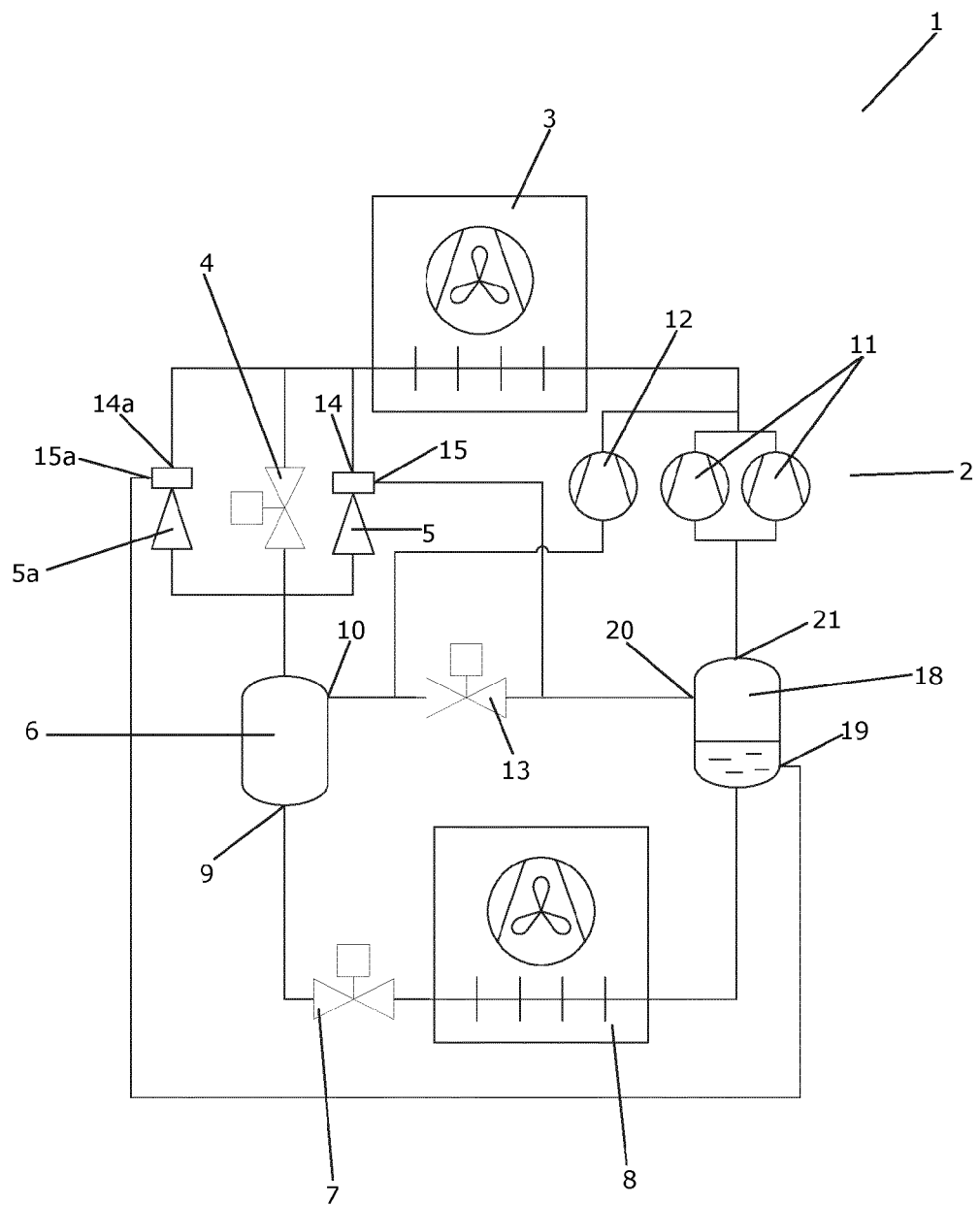
FIG. 3 is a diagrammatic view of a vapour compression system being controlled using a method according to a third embodiment of the invention.

FIG. 3 is a diagrammatic view of a vapour compression 1 system being controlled using a method according to a third embodiment of the invention. The vapour compression system 1 of FIG. 3 is very similar to the vapour compression system 1 of FIG. 1, and it will therefore not be described in detail here.

The vapour compression system 1 of FIG. 3 comprises an additional ejector 5a. The primary inlet 14a of the additional ejector 5a is connected to the outlet of the heat rejecting heat exchanger 3, and the outlet of the additional ejector 5a is connected to the receiver 6. Accordingly, refrigerant leaving the heat rejecting heat exchanger 3 is distributed between the primary inlet 14 of the ejector 5, the primary inlet 14a of the additional ejector 5a and the high pressure valve 4.

The vapour compression system 1 further comprises an additional receiver 18, or separator, arranged to receive refrigerant leaving the evaporator 8, and in which the refrigerant is separated into a liquid part and a gaseous part. A liquid outlet 19 of the additional receiver 18 is connected to a secondary inlet 15a of the additional ejector 5a.

A first gaseous outlet 20 of the additional receiver 18 is connected to the secondary inlet 15 of the ejector, and a second gaseous outlet 21 of the additional receiver 18 is connected to the main compressors 11.

Accordingly, refrigerant leaving the evaporator 8 is supplied to the additional receiver 18, where it is separated into a liquid part and a gaseous part. The liquid part of the refrigerant is supplied to the secondary inlet 15a of the additional ejector 5a, where it undergoes expansion before being supplied to the receiver 6. The gaseous part of the refrigerant in the additional receiver 18 is either supplied to the secondary inlet 15 of the ejector 5, or to the main compressors 11.

The vapour compression system 1 of FIG. 3 is controlled essentially as described above with reference to FIG. 1.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising a compressor unit comprising one or more compressors, a heat rejecting heat exchanger, an ejector, a receiver, an expansion device and an evaporator arranged in a refrigerant path, wherein an outlet of the heat rejecting heat exchanger is connected to a primary inlet of the ejector, an outlet of the ejector is connected to the receiver and an outlet of the evaporator is selectively connected to a secondary inlet of the ejector and/or to an inlet of the compressor unit, and wherein a gaseous outlet of the receiver is connected to the inlet of the compressor unit, the method comprising the steps of:
   detecting a pressure of refrigerant leaving the evaporator,
   detecting a state of the compressor unit, said state of the compressor unit indicating whether or not refrigerant is supplied from the outlet of the evaporator to the inlet of the compressor unit,
   in the case that the step of detecting a state of the compressor unit reveals that refrigerant is supplied from the outlet of the evaporator to the inlet of the compressor unit, operating the compressor unit in order to decrease a pressure inside the receiver,
   in the case that the step of detecting a state of the compressor unit reveals that refrigerant is not supplied from the outlet of the evaporator to the inlet of the compressor unit, comparing the detected pressure of refrigerant leaving the evaporator to a lower threshold value and to an upper threshold value, and
   operating the compressor unit in order to:
      increase the pressure inside the receiver in the case that the detected pressure of refrigerant leaving the evaporator is below the lower threshold value, decrease the pressure inside the receiver in the case that the detected pressure of refrigerant leaving the evaporator is above the upper threshold value, and maintain the pressure inside the receiver in the case that the detected pressure of refrigerant leaving the evaporator is between the lower threshold value and the upper threshold value.

2. The method according to claim 1, wherein the one or more compressors comprises one or more main compressors and one or more receiver compressors, the main compressor(s) being connected to the outlet of the evaporator, and the receiver compressor(s) being connected to the gaseous outlet of the receiver, and wherein the step of detecting the state of the compressor unit further comprises detecting whether or not one or more of the main compressor(s) is/are operating.

3. The method according to claim 2, wherein the step of operating the compressor unit to increase or decrease the pressure inside the receiver comprises operating the receiver compressor(s) to adjust the pressure inside the receiver.

4. The method according to claim 2, further comprising the steps of detecting whether or not one or more of the receiver compressor(s) is/are operating, and operating the one or more main compressor(s) in order to decrease the pressure inside the receiver in the case that the receiver compressor(s) is/are not operating.

5. The method according to claim 1, wherein the compressor unit comprises one or more valves arranged to control whether the inlet of the compressor unit is connected to the gaseous outlet of the receiver or to the outlet of the evaporator, and wherein the step of detecting a state of the compressor unit comprises detecting a state of the one or more valves.

6. The method according to claim 5, wherein the step of operating the compressor unit to decrease the pressure inside the receiver, in the case that refrigerant is supplied from the outlet of the evaporator to the inlet of the compressor unit, comprises switching at least one of the one or more valves to a position where the inlet of the compressor unit is connected to the gaseous outlet of the receiver.

7. The method according to claim 5, wherein the step of operating the compressor unit to decrease or increase the pressure inside the receiver, in the case that refrigerant is not supplied from the outlet of the evaporator to the inlet of the compressor unit, comprises increasing or decreasing a compressor capacity of the compressor unit.

8. The method according to claim 1, wherein the step of operating the compressor unit comprises the steps of:
adjusting a setpoint value for the pressure inside the receiver, in accordance with the detected pressure of refrigerant leaving the evaporator, and
operating the compressor unit in accordance with the adjusted setpoint value.

9. The method according claim 1, wherein the vapour compression system further comprises a high pressure valve interconnecting an outlet of the heat rejecting heat exchanger and an inlet of the receiver, the high pressure valve being arranged in parallel to the ejector, and wherein refrigerant leaving the heat rejecting heat exchanger is divided into a flow passing through the high pressure valve and a flow passing through the ejector, via the primary inlet of the ejector.

10. The method according to claim 1, wherein the vapour compression system is arranged to have the refrigerant be a transcritical refrigerant flowing in the refrigerant path.

11. The method according to claim 1, wherein the heat rejecting heat exchanger is a gas cooler.

12. The method according to claim 1, wherein the vapour compression system further comprises a bypass valve arranged in the refrigerant path interconnecting the gaseous outlet of the receiver and the inlet of the compressor unit, and wherein the method further comprises the step of opening the bypass valve in the case that the pressure inside the receiver decreases below a minimum value.

13. The method according to claim 3, further comprising the steps of detecting whether or not one or more of the receiver compressor(s) is/are operating, and operating the compressor unit in order to decrease the pressure inside the receiver in the case that the receiver compressor(s) is/are not operating.

14. The method according to claim 6, wherein the step of operating the compressor unit to decrease or increase the pressure inside the receiver, in the case that refrigerant is not supplied from the outlet of the evaporator to the inlet of the compressor unit, comprises increasing or decreasing a compressor capacity of the compressor unit.

15. The method according to claim 2, wherein the step of operating the compressor unit comprises the steps of:
adjusting a setpoint value for the pressure inside the receiver, in accordance with the detected pressure of refrigerant leaving the evaporator, and
operating the compressor unit in accordance with the adjusted setpoint value.

16. The method according to claim 3, wherein the step of operating the compressor unit comprises the steps of:
adjusting a setpoint value for the pressure inside the receiver, in accordance with the detected pressure of refrigerant leaving the evaporator, and
operating the compressor unit in accordance with the adjusted setpoint value.

17. The method according to claim 4, wherein the step of operating the compressor unit comprises the steps of:
adjusting a setpoint value for the pressure inside the receiver, in accordance with the detected pressure of refrigerant leaving the evaporator, and
operating the compressor unit in accordance with the adjusted setpoint value.

18. The method according to claim 5, wherein the step of operating the compressor unit comprises the steps of:
adjusting a setpoint value for the pressure inside the receiver, in accordance with the detected pressure of refrigerant leaving the evaporator, and
operating the compressor unit in accordance with the adjusted setpoint value.

* * * * *